Aug. 10, 1965    J. A. DYKA    3,199,566
WELD FASTENERS
Filed April 30, 1962

Inventor,
Joseph A. Dyka,
by Francis K. Doyle
His Attorney.

United States Patent Office 3,199,566
Patented Aug. 10, 1965

3,199,566
WELD FASTENERS
Joseph A. Dyka, 19 Richmond St., Adams, Mass.
Filed Apr. 30, 1962, Ser. No. 191,241
2 Claims. (Cl. 151—41.7)

This invention relates to weld fasteners, and, more particularly, to weld fasteners made from a light, non-ferrous metal, such as aluminum, magnesium, and the like.

A weld fastener is generally considered as a metallic part which is provided with internal or external threads, or both such threads. This metallic part is welded permanently in place on a metal device to provide securing means for the metal device. The use of weld fasteners, usually made from a low carbon steel, as securing means for various types of metal devices, also generally made from a type of steel or other ferrous material, is well known to those skilled in this art. However, it is considered impractical to use weld fasteners with metal devices made of light, non-ferrous metal, such as aluminum, magnesium and the like. In general, the low carbon steel fasteners will not form a strong, secure weld to the light metal device, because of the difference in thermal expansion, melting point and heat dissipation.

It is well known that increasing use is being made of the various light metals, such as aluminum and magnesium in the various fields of transportation, such as, for example, the aeronautics field and the automotive field. In the increasing use of these light metals, many problems have arisen, due to the inability of the art to weld the known types of weld fasteners to the devices made from these light metals. Projection welding of light metal fasteners has generally been unsatisfactory because the heat in welding is dissipated throughout the entire body of the fastener. Therefore, the point of contact between the fastener and the metal part to which it is secured does not receive sufficient heat to form a good weld. The weld will not absorb any great amount of torque, thus tending to twist off when used for fastening. If an arc welding process is used to secure a light metal fastener to a metal part, the fastener becomes distorted and its threads are deformed, making the fastener useless for the purpose desired. Therefore, in some instances, the practice has developed of welding a block of light metal to the part of the device where a fastener is desired. After welding, the block of light metal is drilled and tapped, or turned down and tapped, to provide the desired fastener. Obviously, this process of providing weld fasteners of light metal is very expensive, both from the labor time involved, and the production time used.

It is, therefore, one object of this invention to provide a light metal weld fastener which may be welded to a portion of a light metal device without any further work or processing being necessary to prepare the fastener for use.

A further object of this invention is to provide a new light metal weld fastener which may be welded to a light metal device without deforming the threaded portion of the fastener.

A further object of this invention is to provide a light, non-ferrous metal fastener having a novel insert therein which will enable the fastener to be welded to another light metal part with projection welding equipment.

A still further object of this invention is to provide a new and novel light metal weld fastener which may be welded to a light metal device with the use of production line welding equipment.

Briefly, in one form, this invention comprises a weld fastener which is formed of a light, non-ferrous metal body, such as, for example, aluminum of magnesium, having a portion of such body shaped for welding to a light metal device. The body is provided with an insert or an exterior member in the form of threads made from steel or other ferrous material.

The invention which is desired to be protected will be particularly pointed out in the claims appended hereto. However, it is believed that this invention, and the manner in which its objects and advantages are obtained, as well as other objects and advantages thereof, will be better understood from the following detailed description of the preferred embodiments of the invention, when considered in the light of the accompanying drawing, in which:

Figure 1:
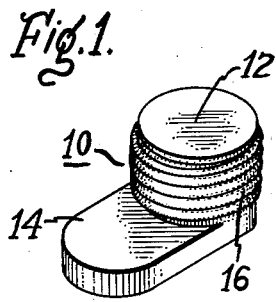
FIGURE 1 is a perspective view of one form of weld fastener made according to this invention.

Referring now to the drawing, in which like numerals are used to indicate like parts throughout the various views thereof, and considering especially FIGURE 1, one form of this invention is shown as a light metal weld fastener 10, comprising a body member 12 made from any of the wellknown light, non-ferrous metals, such as, for example, aluminum or magnesium. In the form of the invention shown in FIGURE 1, the weld fastener is a weld screw or stud, so the body member 12 is shown as cylindrical in shape. A right angled securing or welding member 14 is formed on the body 12, designed for welding the body member 12 to a desired light metal device (not shown). In order to provide a weld fastener which will not have its threaded portion distorted or deformed during the welding operation, a threaded member 16 is provided. Threaded member 16 is formed of steel or other ferrous material and is firmly secured to the outer surface of the body member 12. One method of securing the threaded member 16 to the body 12 is to cast the weld fastener 10 in a mold in which the threaded member 16 has first been placed. Obviously, other means can be used to secure the threaded member 16 to the body 12, for example, it could be threaded thereon, if desired.

Figure 2:
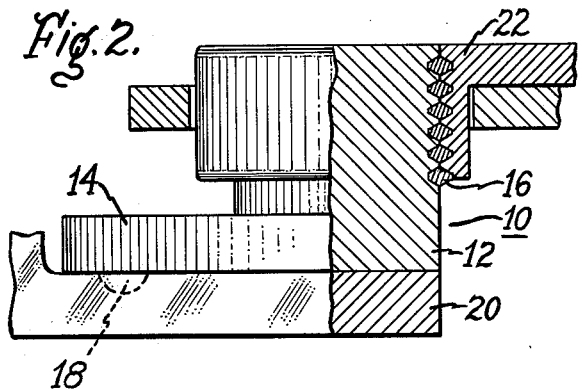
FIGURE 2 is a plan view, partially in section, showing the weld fastener of FIGURE 1 in use.

In FIGURE 2 of the drawing, a light metal weld fastener is shown as being used with a light metal device. Considering FIGURE 2, the light metal weld fastener 10 is shown as being fastened to a light metal device, such as magnesium or aluminum member 20. As will be understood by those skilled in this art, the weld fastener 10 is secured to the device 20 by welding the weld member 14 thereto, as indicated at 18. The heat which is generated by the welding operation does not deform the ferrous metal threads 16, which is secured to the outer surface of the body member 12. When the weld fastener is securely fastened to the device 20, any other member may be attached to the device 20 by means of the weld fastener 10. For example, as shown in FIGURE 2, a metal member 22 is fastened to the device 20 by threading on to the weld fastener 10.

Figure 3:
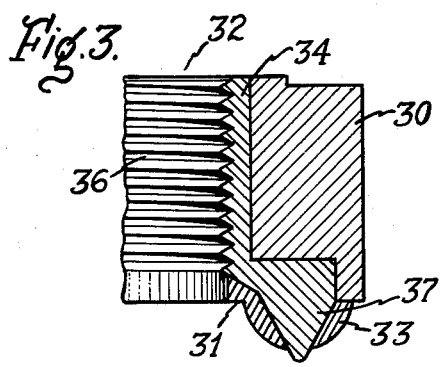
FIGURE 3 is a partial, sectional view of another form of weld fastener made according to this invention.
Figure 3A:
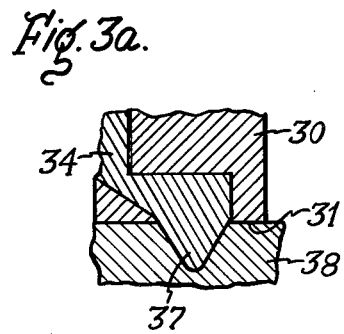
FIGURE 3a is a partial sectional view, similar to FIGURE 3, showing the fastener secured to another metal part.
Figure 4:
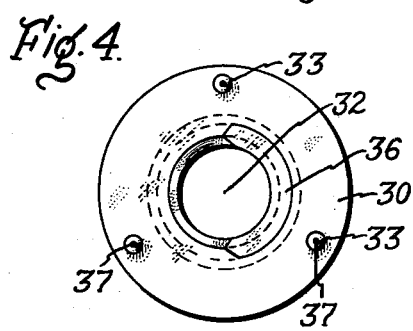
FIGURE 4 is a bottom view of the weld fastener shown in FIGURE 3.

FIGURES 3, 3a, and 4 show another type of weld fastener made according to another form of this invention. The body 30 of the weld fastener may be of any desired configuration, a cylindrical form being indicated in FIG- URE 4. The body 30, of a light, non-ferrous metal, is provided with a central bore 32, and firmly secured within the bore 32 is a ferrous metal insert 34. The ferrous insert 34 is provided with a threaded portion 36, which forms the internal threaded part of the weld fastener, in a manner similar to ferrous member 16 of FIGURES 1 and 2. Ferrous member 34 also is provided with projecting portions 37, which extend below the lower end or bottom of the body 30. As shown in FIGURES 3 and 4, the bottom 31 of the body 30 is provided with a number of welding projections 33, three such projections being shown in FIGURE 4. Projections 33 may be formed as part of body member 30, or they may be separate portions, as desired. The projecting portions 37 of ferrous member 34 extend through the projections 33, such that the projecting portions 37 form the lowermost part of the weld member. By means of the weld fastener of this form of the invention, the fastener may be welded to another light, non-ferrous metal part with the use of production line equipment, such as projection welding equipment. As will be apparent, the electric current in the welding operation will flow through the body 30 and the ferrous member 34 and through the projecting portions 37 into the member to which it is to be welded, such as member 38 in FIGURE 3a. Since all of the welding current flows through the projecting portions 37, these portions will become very hot, melting the light metal of projections 33 and the part of the metal member 38 which the projecting portions 37 contact. With the current flowing through the projecting portions 37 of the ferrous member 34, the projecting portions will retain a substantial amount of heat, rather than dissipating it throughout the body 30, as would be the case with only a light metal body.

As can be seen from FIGURE 3a, the projections 33 of the weld member flow completely into the metal of the part 38, to which the fastener is welded. Thus, by means of this invention, a light metal weld fastener can be readily welded to a light metal part to form a strong, secure bond therewith.

If desired, the weld member shown in FIGURES 3 and 4 may also be provided with an external threaded member, such as member 16, of FIGURE 1. Of course, it will be understood that the external threaded member will also be formed from a ferrous material, such that it will not be deformed during the welding operation. By providing both an external thread and an internal thread the weld member shown in FIGURES 3 and 4 may be used either as a weld screw or a weld nut. The threaded members will be securely fastened to the body member 30 in any desired manner so that they will not be subject to dislocation when used.

Figure 5:
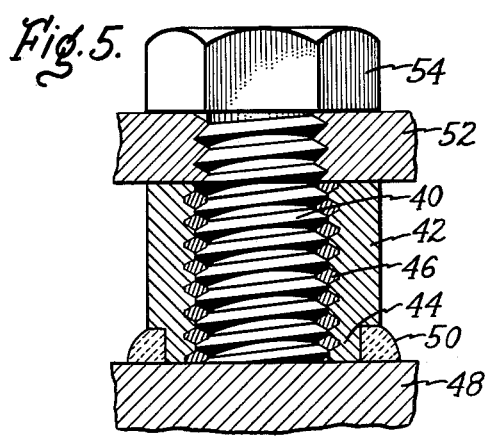
FIGURE 5 is a sectional view, similar to FIGURE 3, showing a similar type of weld fastener in use, and secured in another manner.
Figure 6:
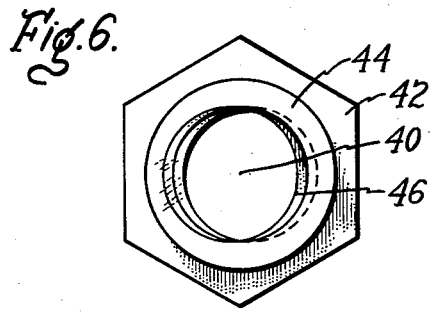
FIGURE 6 is a bottom view of the weld fastener shown in FIGURE 5.

Referring now to FIGURES 5 and 6 of the drawing, a weld nut is shown having an elongated, hexagonal body 42 and an undercut portion 44, acting as a weld member. A central bore 40 is provided and a threaded member 46 is firmly secured to the wall thereof. As in the previous examples, the body member 42 and the weld portion 44 are formed of a light metal, while the threaded member 46 is formed of a ferrous material which will not deform during welding. The weld member of FIGURES 5 and 6 is shown as being welded to a light metal device 48 by the weld 50. Another member 52 is shown as being attached to device 48 by means of a bolt member 54.

It will be understood that in some instances, the embodiment of the invention shown in FIGURES 3, 3a and 4 may be used without providing a threaded portion to the insert. For example, a number of ferrous inserts may be provided, as shown in FIGURES 3 and 4, merely using the portion embedded in the weld member and extending therefrom to form the lowermost part of the weld member. As has been discussed, with reference to FIGURES 3, 3a and 4, the ferrous metal projections will carry all of the weld current, enabling the welding of the weld member to another light metal body, without dissipating the heat through the weld member. Thus, it will be possible to weld such weld member without deforming the member due to excess heat.

From the above detailed description of the present preferred embodiments of this invention it will be obvious that a light metal weld fastener has been provided which may be welded to any desired light metal device without destroying its utility. While there has been shown and described the preferred embodiments of this invention, it will be obvious to those skilled in this art that various changes may be made without departing from the spirit and scope of this invention as defined in the appended claims.

What is claimed as new and which it is desired to secure by Letters Patent of the United States is:

1. A light metal weld fastener comprising; a body member formed of a light, non-ferrous metal, welding projections provided on said body member, a threaded member of ferrous metal secured to said body member, the threads of said threaded member positioned to secure an external member to said body member, said threaded member being provided with projecting portions which extend below and through said welding projections on said body member, whereby said projecting portions will contact the part to which the fastener is to be welded.

2. A light metal weld fastener comprising; a body member formed of a light, non-ferrous metal, welding projections provided on said body member, an insert of ferrous metal secured in said body member, said ferrous insert provided with threads positioned to secure an external member to said body member, said insert having projecting portions which extend below and through said welding projections on said body member, whereby said projecting portions will contact the part to which the fastener is to be welded.

References Cited by the Examiner

UNITED STATES PATENTS

| | | | |
|---|---|---|---|
| 2,150,876 | 3/39 | Caminez | 85—46 |
| 2,210,353 | 8/40 | Barnes. | |
| 2,262,450 | 11/41 | Caminez | 85—46 |
| 2,363,662 | 11/44 | Findley | 85—46 |
| 2,784,758 | 3/57 | Rohe | 151—41.7 |
| 2,796,907 | 6/57 | Dumas | 85—32 |
| 3,091,990 | 6/63 | McVittie | 85—2.8 |

EDWARD C. ALLEN, *Primary Examiner.*